J. T. Thomson,
Ship Cleat.
No. 107,738.  Patented Sep. 27, 1870.
Fig. 1.
Fig. 2.
Witness
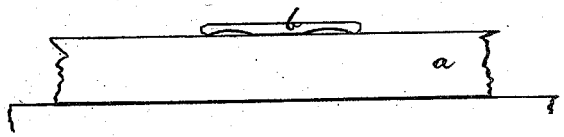
Inventor
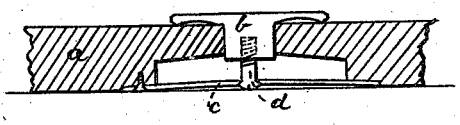
Per W. A. Clifford Atty

United States Patent Office.

JOHN T. THOMSON, OF SOUTHPORT, MAINE.

Letters Patent No. 107,738, dated September 27, 1870.

IMPROVEMENT IN SNAPPER-CLEATS.

The Schedule referred to in these Letters Patent and making part of the same.

*To all whom it may concern:*

Be it known that I, JOHN T. THOMSON, of Southport, in the county of Lincoln and State of Maine, have invented a new and useful improved Snapper-Cleat; and I hereby declare the following to be a full, clear, and exact description of said invention, which will enable others to make and use the same, reference being had to the accompanying drawing forming a part of this specfication, in which—

Figure 1 shows a side view of same.

Figure 2, a side section.

It is common, in mackerel fishing, for several lines to be tended by one man, and my invention has for its object a convenient means of fastening these lines to the vessel, so that they may be secure, and at the same time be quickly and easily disengaged, if necessary, or if it is desired to raise or lower them in the water. I do this by fastening to the rail of the vessel a strip or cleat, shown at *a*, to which are attached, at regular intervals, the snappers or catches for holding the lines. One of these is shown in the drawing, but in use, each line is provided with its snapper. These snappers are attached to the cleat by a screw passing through the spring *c* on the bottom of the cleat.

This spring is made fast to the cleat at one end and loose at the other, fitting into a groove in the cleat.

The screw *d* passes through the middle of it into the snapper, (see fig. 2,) which may be drawn close to the cleat by setting up the screw, while the spring enables it to be raised sufficiently to pass the line under it, and holds it securely in any position. This enables the snapper to be tightened should the cleat become worn. This cleat has also the advantage of protecting the fisherman from the water, which otherwise is brought into the vessel by the wet lines, the outer edge of said cleat catching the water and running it off over the rail.

What I claim as my invention and desire to secure by Letters Patent, is—

A snapper-cleat, which is provided with snappers *b*, springs *c*, and screws *d*, by which it is capable of adjustment when worn, as and for the purposes described.

JOHN T. THOMSON.

Witnesses:
WM. FRANKLIN SEAVEY,
GEO. E. BIRD.